(12) United States Patent
Van Casteren

(10) Patent No.: US 7,518,318 B2
(45) Date of Patent: Apr. 14, 2009

(54) CIRCUIT FOR A GAS-DISCHARGE LAMP

(75) Inventor: Dolf Henricus Jozef Van Casteren, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 202 days.

(21) Appl. No.: 10/500,682

(22) PCT Filed: Dec. 20, 2002

(86) PCT No.: PCT/IB02/05668

§ 371 (c)(1),
(2), (4) Date: Jul. 2, 2004

(87) PCT Pub. No.: WO03/059022

PCT Pub. Date: Jul. 17, 2003

(65) Prior Publication Data

US 2005/0116663 A1 Jun. 2, 2005

(30) Foreign Application Priority Data

Jan. 8, 2002 (EP) .................................. 02075031

(51) Int. Cl.
*H05B 37/02* (2006.01)
(52) U.S. Cl. .................... 315/291; 315/209 R; 315/307
(58) Field of Classification Search ................ 315/291, 315/209 R, 244, 307, 246–247, 224–225
See application file for complete search history.

(56) References Cited

U.S. PATENT DOCUMENTS

| | | | | |
|---|---|---|---|---|
| 4,949,016 A | * | 8/1990 | De Bijl et al. ............... | 315/208 |
| 5,223,767 A | * | 6/1993 | Kulka ...................... | 315/209 R |
| 5,410,221 A | * | 4/1995 | Mattas et al. ............... | 315/307 |
| 5,428,268 A | | 6/1995 | Melis et al. ................. | 315/247 |
| 5,471,117 A | * | 11/1995 | Ranganath et al. .......... | 315/247 |
| 5,491,388 A | * | 2/1996 | Nobuyuki et al. ........... | 315/308 |
| 5,650,694 A | * | 7/1997 | Jayaraman et al. .......... | 315/225 |
| 5,680,015 A | * | 10/1997 | Bernitz et al. ............... | 315/291 |
| 5,969,484 A | * | 10/1999 | Santi et al. .................. | 315/247 |
| 6,225,755 B1 | * | 5/2001 | Shen .......................... | 315/247 |
| 6,359,395 B1 | * | 3/2002 | Quazi et al. ................. | 315/307 |
| 6,362,575 B1 | * | 3/2002 | Chang et al. ................ | 315/224 |
| 6,429,604 B1 | * | 8/2002 | Chang ........................ | 315/244 |
| 6,437,515 B1 | * | 8/2002 | Kamoi et al. ........... | 315/209 R |
| 6,548,966 B2 | * | 4/2003 | Kawasaka et al. ........... | 315/291 |
| 6,674,248 B2 | * | 1/2004 | Newman et al. ............. | 315/247 |
| 6,680,585 B2 | * | 1/2004 | Trestman ..................... | 315/291 |
| 2001/0002781 A1 | * | 6/2001 | Kim ........................... | 315/211 |
| 2003/0102818 A1 | * | 6/2003 | Shen .......................... | 315/291 |
| 2003/0111968 A1 | * | 6/2003 | Trestman ..................... | 315/291 |

\* cited by examiner

*Primary Examiner*—David Hung Vu
*Assistant Examiner*—Tung X Le

(57) ABSTRACT

A circuit for a discharge lamp includes a first sub-circuit for connecting to mains voltage of a predetermined frequency for rectifying the mains voltage; and a second sub-circuit connected to the first sub-circuit for providing an alternating current, such as a square-wave current, required for the lamp. A control circuit is connected to the first and the second sub-circuit. The control circuit controls the frequency of the alternating current subject to a varying component of the mains voltage rectified by the first sub-circuit.

11 Claims, 4 Drawing Sheets

CIRCUIT FOR A GAS-DISCHARGE LAMP

The present invention relates to a lamp circuit. Such circuits are marketed by applicant with the purpose of making gas-discharge lamps, in particular fluorescent lamps or metal-halide lamps, function in a correct manner. Metal-halide lamps require for instance a relatively high ignition voltage (about 3500-5000 V), whereafter during the stage of normal operation reached via one or more intermediate stages, the circuit must supply a current that is as constant as possible to the metal-halide lamps at an operating voltage of for instance 100 V. Such a lamp has a negative impedance characteristic on a short time scale, therefore it must be current controlled.

Such lamps and associated circuits have now proved their market value, particularly in shopping centers, public buildings and the like, as a result of their relatively high light output. However, the known circuits are in some respects complicated and voluminous, which is undesirable in terms of component and fabrication costs.

The present invention provides a circuit for a lamp, comprising:
- a first sub-circuit for connecting to mains voltage of a predetermined frequency for rectifying the mains voltage;
- a second sub-circuit connected to the first sub-circuit for providing an alternating current required for the lamp; and
- a control circuit which is connected to the first and the second sub-circuit and which controls the frequency of the alternating current subject to a varying component of the mains voltage rectified by the first sub-circuit.

By virtue of the present invention such a circuit can be embodied so as to be simpler and less voluminous since a buffer capacitor in such a circuit can be reduced considerably in size, for instance by a factor of ten. The currently available electrolyte capacitors, which as a result of drying out may have a limited lifespan, can moreover be replaced by more robust film capacitors with smaller capacitance values.

The first sub-circuit preferably comprises a so-called pre-conditioner which, generally speaking, comprises a filter with one or more coils and capacitors, a rectifier circuit such as a bridge rectifier in combination with a boost converter or a flyback converter comprising an (electronic) switch, and a buffer capacitor that is coupled to the output terminals.

In a further preferred embodiment, the second sub-circuit comprises a converter circuit for stabilizing direct current and a switching device for providing a square-wave current of a desired level of for instance ±100 V for normal operation of the lamp.

In a further preferred embodiment, the control circuit is connected on one side to an (electronic) switch in the first sub-circuit and on the other side to one or more (electronic) switches in the switching device part, so that the phase and/or frequency of the lamp current controlled by the commutator is controlled subject to a varying component of for instance 50 Hz or a multiple thereof (for the USA and Japan 60 Hz or a multiple thereof).

In a further preferred embodiment of the present invention, the frequency of the alternating current provided by the second sub-circuit is made equal to the frequency of a varying component of the mains voltage rectified by the first sub-circuit.

In a further preferred embodiment of the present invention, the control circuit controls the phase of the alternating current provided by the second sub-circuit such that this is the same as the phase of a varying component of the rectified mains voltage provided by the first sub-circuit.

These and other aspects of the invention are explained hereinbelow with reference to associated Figures, in which.

Figure 1:
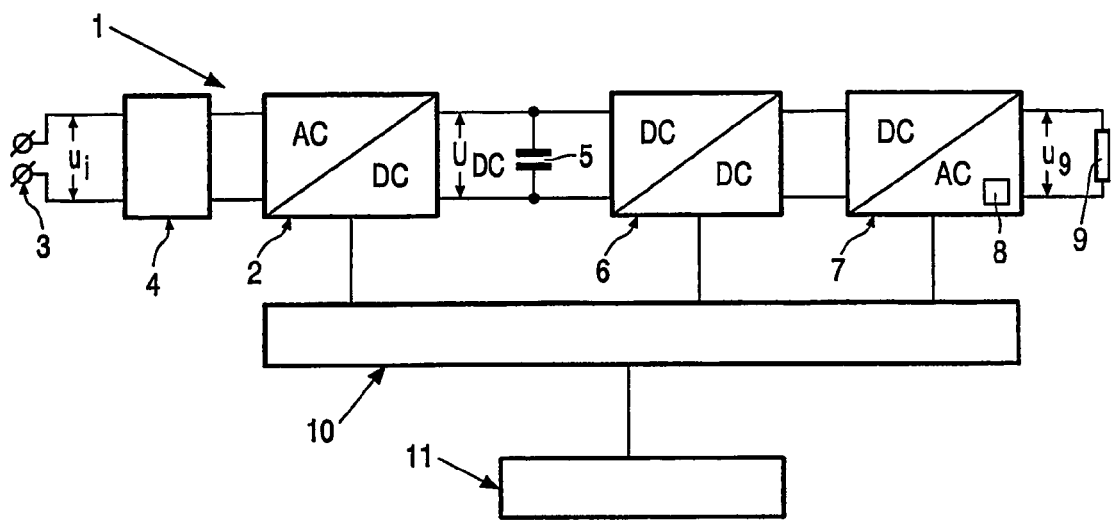
FIG. 1 shows a block diagram of a circuit for a lamp according to a preferred embodiment of the present invention.

FIG. 1 shows a circuit for a lamp 1 comprising a pre-conditioner 2 for rectifying the supplied alternating voltage us and bringing it to a desired voltage level. Depending on the requirements made on the current drawn from the mains 3, concerning the power factor and the harmonic distortion thereof, the component values of the pre-conditioner are adapted. Adding an interference filter 4 can help to meet these requirements. Part of the pre-conditioner is an energy buffer 5 to which the subsequent sub-circuits are connected. Provided across the energy buffer 5 is the rectified voltage $U_{DC}$ with an average value in the order of 400 V, to which a stabilizer 6 is connected for stabilizing direct current supplied to a commutator 7 in which an igniter 8 for igniting lamp 9 is arranged. Commutator 7 provides for instance a square-wave current $i_c$ to lamp 9, which is for instance a metal-halide lamp with an output of 80 lm/W and a lifespan in the order of 10,000 hours, with $u_9$ being the voltage across the lamp. Such lamps, which use such an electronic circuit, are supplied by applicant and bear type designations MH and CDM in the power range of 35-150 W. Control circuit 10, which is connected to pre-conditioner 2, stabilizer 6 and commutator 7, controls these sub-circuits so as to provide the above-stated properties. The light level can be controlled (dimming) by the externally available light level control 11.

Figure 2:
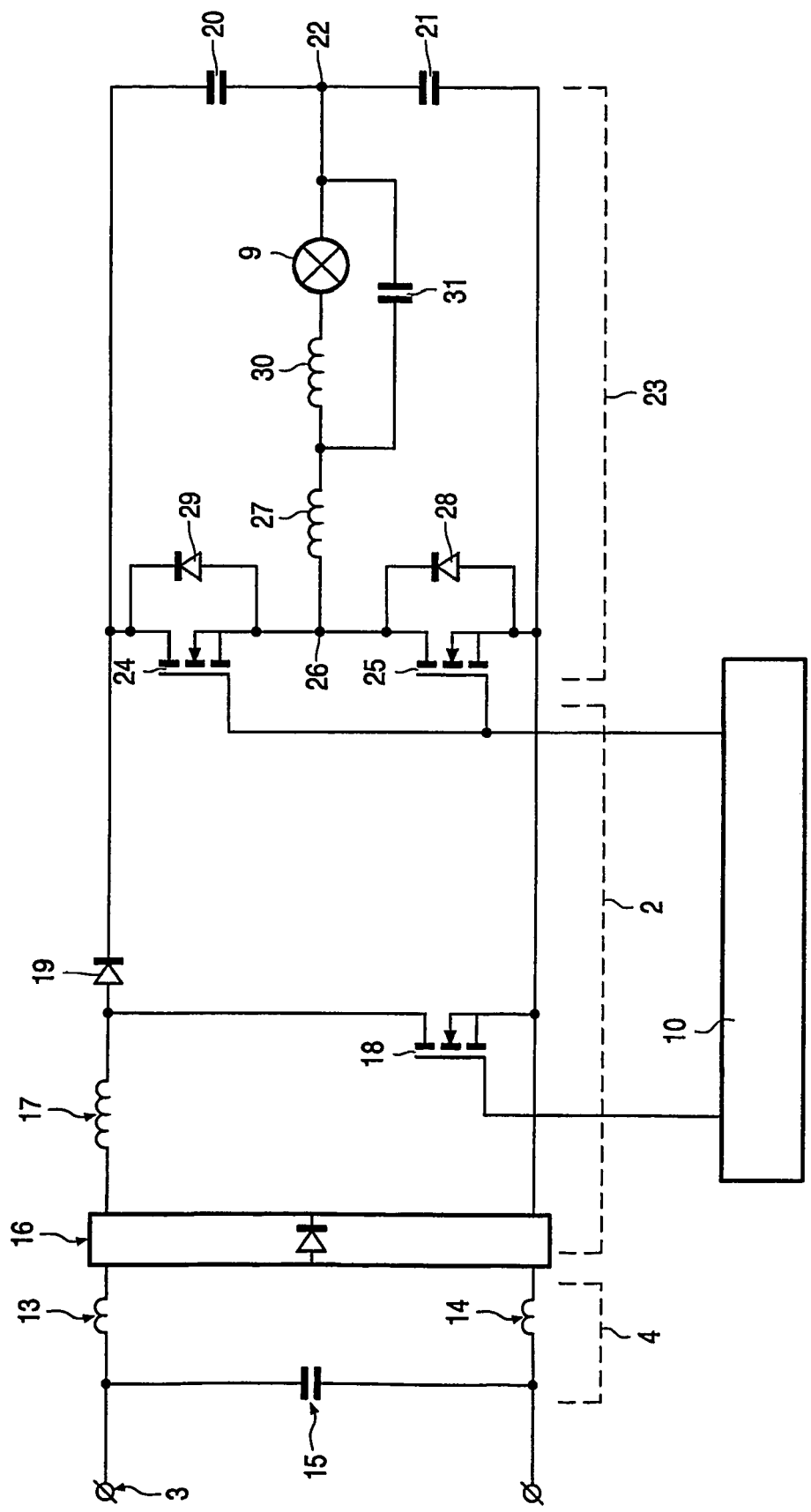
FIG. 2 shows a diagram of a part of the circuit of FIG. 1 according to a preferred embodiment.

FIG. 2 is a more detailed diagram of circuit 1, representing the preferred embodiment of the invention, showing the mains voltage 3 to which the circuit is connected, followed by an interference filter 4 consisting of coils 13 and 14 and capacitor 15. Pre-conditioner 2 comprises the double-sided rectifier 16 followed by coil 17 and FET 18. After opening of the FET, the coil 17 wants to maintain the current across said FET by generating a voltage, resulting, via the diode 19, in a direct voltage $U_{DC}$ across the buffer capacitors 20 and 21 that perform the task of buffer capacitor 5 in FIG. 1. At the connection 22 between capacitors 20 and 21, the voltage value is (0.5 $U_{DC}$). In the preferred embodiment as shown in FIG. 2, the stabilizer, commutator and buffer capacitor are combined in one circuit 23, the so-called half-bridge commutating forward (HBCF) 23. The HBCF comprises FETs 24 and 25 that are alternately made conducting or non-conducting at a determined frequency by control circuit 10, the voltage $u_{22,26}$ across the points 22 and 26 of the circuit being alternately plus or minus half the rectified voltage. Coil 27 is present to provide a stabilized current to the series connection of lamp 9 and coil 30. The coil 30 in combination with capacitor 31 filters the varying component of the load current provided by coil 27. Diodes 28 and 29 are arranged parallel to the FETs 24 and 25 to release stored energy from coil 27. To ignite the lamp 9, an igniter (not shown) is coupled via a transformer connection to coil 30 during starting of the lamp 9, which igniter co-acts with capacitor 31.

Figure 3:
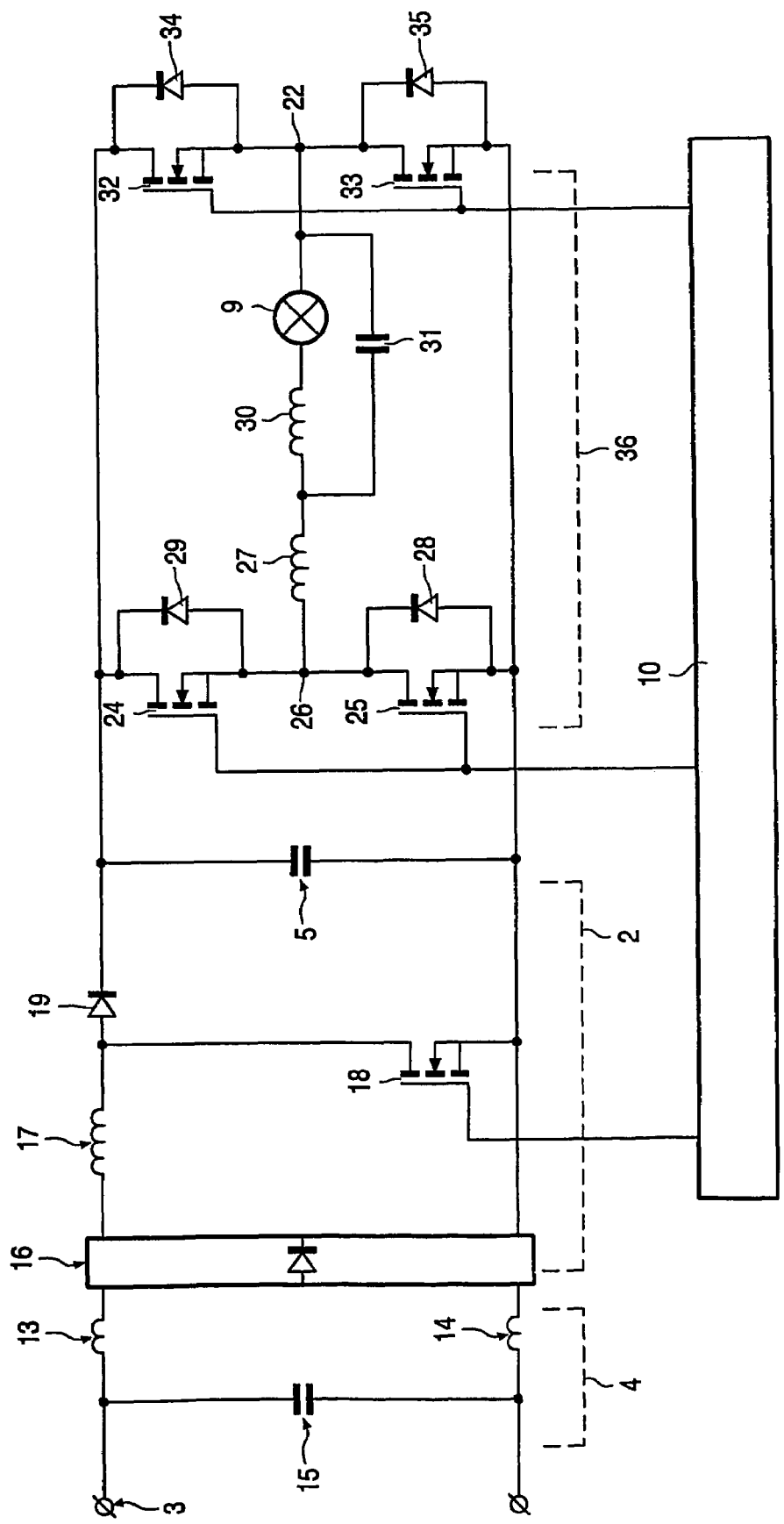
FIG. 3 shows a diagram of a part of the circuit of FIG. 1 according to a further embodiment.

A further possible embodiment of the invention concerns a full-bridge commutating forward (FBCF) 36 as shown in FIG. 3, comprising four FETs 24, 25, 32 and 33. FET 24 and 33 are alternately made conducting or non-conducting and FETs 25 and 32 are alternately made non-conducting or conducting, respectively. Buffer capacitor 5 is present in this case to supply the rectified voltage, so that the entire rectified voltage $U_{DC}$ is provided across points 22 and 26 of the circuit.

In a still further embodiment of the invention (FIG. 4), the stabilizer and commutator are implemented separately as the down converter 37 and the fall-bridge commutator 38. The down converter comprises a FET 39, diode 40, coil 41 and capacitor 42, the FET 39 being turned on and off by the control circuit 10. The FETs 24 and 33 and the FETs 25 and 32 are made alternately conducting or non-conducting respectively.

Figure 5A:
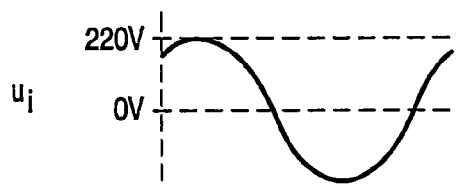
FIG. 5 shows a graph with voltage and current values varying in time in the circuits of FIGS. 1-4 as an elucidation of the operation thereof.
Figure 5B:
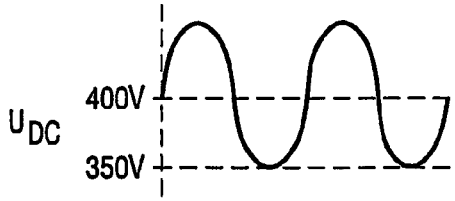
Figure 4:
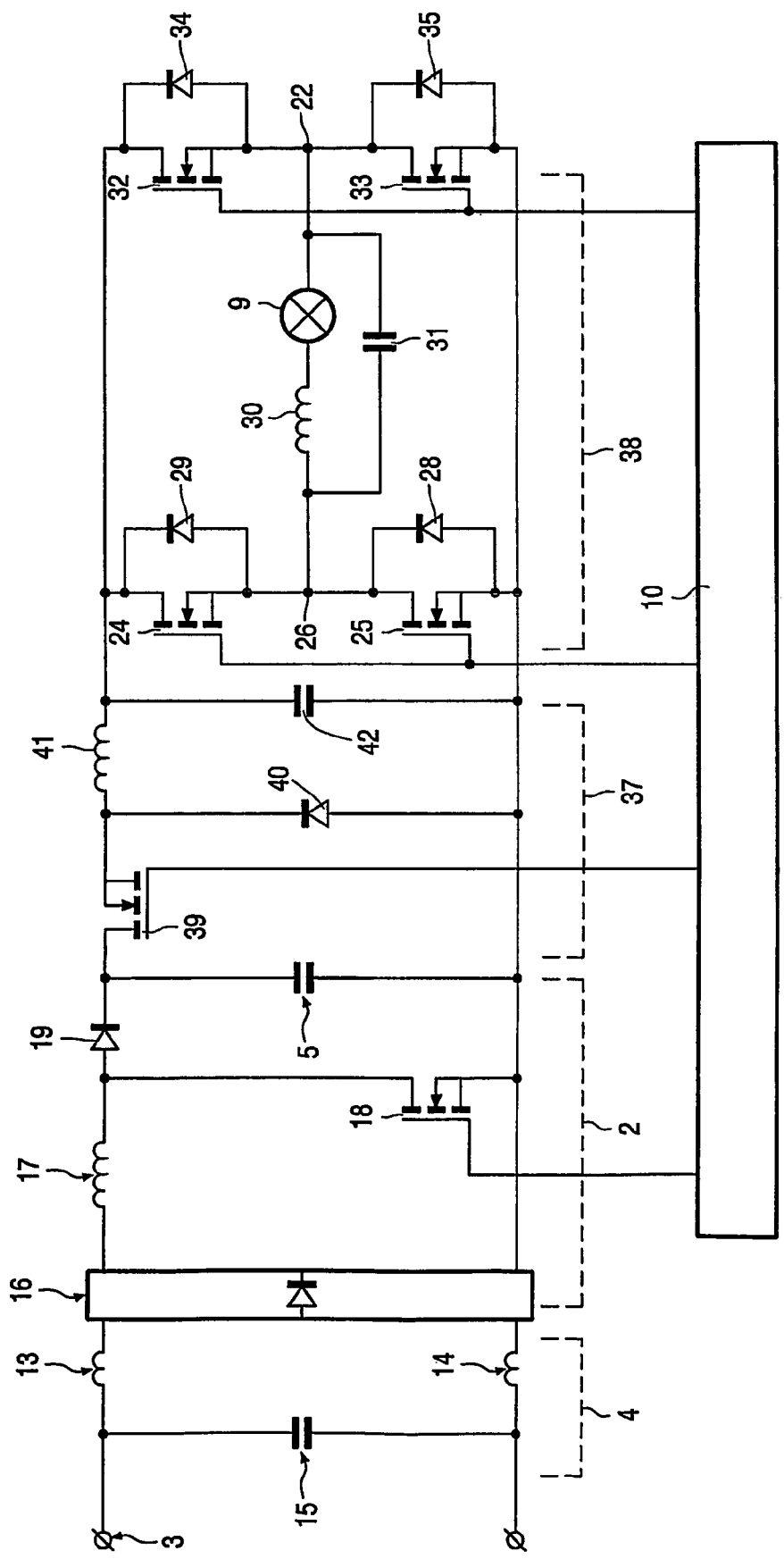
FIG. 4 shows a diagram of a part of the circuit of FIG. 1 according to a further embodiment.

FIGS. 5A and 5B show the voltages at different locations in the circuit. The mains voltage is 220 V-240 V at a frequency of about 50 Hz-60 Hz (FIG. 5A). The rectified voltage $U_{DC}$ (FIG. 5B) on the buffer capacitor has an average voltage level of for instance 400 V, with the varying component present thereon having a fundamental frequency of 100 Hz-120 Hz with a peak-to-peak value which depends on the capacitance of the buffer capacitor 20+21 (FIG. 2) or 5 (FIG. 3 or 4). This varying component has a peak-to-peak value of for instance 10 V at a buffer capacitance of 68 µF and of for instance 100 V at a buffer capacitance of 6.8 µF if the load is a 70 W lamp.

Figure 5C:
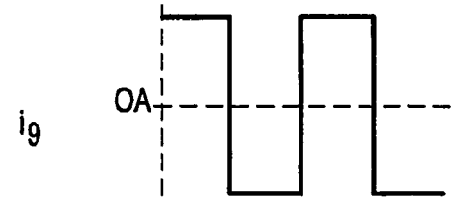
Figure 5D:
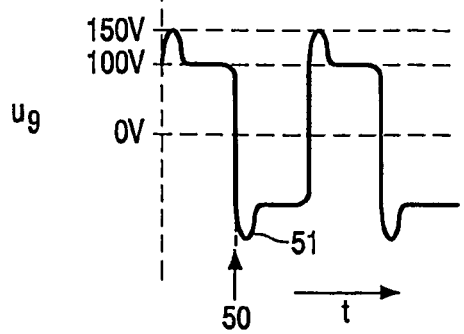

When the HBCF circuit is used (FIG. 2), half the voltage $U_{DC}$ is provided across the series of coils 27 and 30 and lamp 9. The lamp current $i_9$ (FIG. 5C) is a square-wave current with a value of about 0.8 A if loaded with a 70 W lamp. The voltage $u_9$ of about 100 V across the lamp 9 is shown in FIG. 5D. After the moment of commutation, i.e. the moment the current changes direction, there will however occur a so-called restart peak 51 during which the voltage across the lamp assumes a higher value in the order of 150 V for a short time (FIG. 5D). If the supplied voltage, i.e. the available open circuit voltage, is now lower than the voltage of this restart peak, the lamp will go out.

The control circuit controls the FETs such that the square-wave current applied to the lamp is synchronized with the voltage across the buffer capacitor, the square-wave current having a frequency which is equal to the fundamental frequency of the varying component of supply voltage $U_{DC}$. This means that at the moment of commutation the voltage available to the lamp will always equal (half) the mean value of the supply voltage $U_{DC}$, the Open Circuit Voltage (OCV), and is guaranteed, so that during the commutation the OCV will always have a value greater than the necessary re-ignition voltage of the lamp. The lamp circuit can be optimized by reducing the size of the energy buffer, as a result of which also the lifespan and the reliability of the circuit and of the lamp are improved.

A circuit for a lamp according to the present invention is an optimized circuit as regards both the requirements made on the current drawn from the mains by using a pre-conditioner and as regards the open-circuit voltage that is available to the gas discharge lamp. In addition, the capacitance of the buffer capacitor can be reduced, causing the lifespan of the circuit and the lamp to be increased and the size of the circuit to be reduced. The lamp used will burn reliably since the open circuit voltage available to the lamp is always greater than the voltage demanded by the lamp.

The present invention is not limited to the above-described preferred embodiment thereof; the rights sought are defined however by the following claims, within the scope of which many modifications can be envisaged.

The invention claimed is:

1. A circuit for a lamp, comprising:
a first sub-circuit for connecting to mains voltage of a predetermined frequency for rectifying the mains voltage and forming a rectified mains voltage having a first frequency;
a second sub-circuit connected to the first sub-circuit for providing an alternating current required for the lamp, the alternating current having a second frequency;
a control circuit which is connected to the first sub-circuit and the second sub-circuit and which controls the second frequency of the alternating current subject to the first frequency of the mains voltage rectified by the first sub-circuit, the control circuit controlling a first transistor having a first terminal and a second transistor having a second terminal, the first transistor and the second transistor being connected together at a common terminal;
a first buffer capacitor connected between the lamp and the first terminal; and
a second buffer capacitor connected between the lamp and the second terminal;
wherein the second frequency of the alternating current provided by the second sub-circuit is synchronized with the first frequency, and
wherein a peak-to-peak value of a voltage signal of the rectified mains voltage having the first frequency depends on a combined capacitance of the first buffer capacitor and the second buffer capacitor.

2. The circuit of claim 1, wherein the second sub-circuit comprises a converter circuit for stabilizing direct current and a switching device for providing a square-wave current of a desired level.

3. The circuit of claim 2, wherein the desired level is ±0.8 A for normal operation of the lamp.

4. The circuit of claim 1, wherein the control circuit is connected on one side to a switch in the first sub-circuit and on the other side to one or more switches in a switching device, so that the phase and/or frequency of the lamp current controlled by the switching device is controlled subject to the predetermined frequency of the mains voltage or a multiple thereof.

5. The circuit of claim 1, wherein the second sub-circuit comprises an igniter for generating voltage pulses across the lamp so as to ignite the lamp.

6. The circuit of claim 1, wherein the rectified mains voltage is in the order of magnitude of 400 V and the voltage across the lamp is in the order of magnitude of 100 V to 150 V.

7. The circuit of claim 1, wherein the peak-to-peak value is 10-100 V.

8. A circuit for a lamp, comprising:
a first sub-circuit for connecting to mains voltage of a predetermined frequency for rectifying the mains voltage and forming a rectified mains voltage having a first frequency;
a second sub-circuit connected to the first sub-circuit for providing an alternating current required for the lamp, the alternating current having a second frequency; and
a control circuit which is connected to the first sub-circuit and the second sub-circuit and which controls the second frequency of the alternating current subject to the first frequency,
wherein the first sub-circuit comprises a filter with one or more coils and capacitors, a rectifier circuit, a switch and a buffer capacitor that is coupled to its output terminals, wherein a peak-to-peak value of a voltage signal of the rectified mains voltage having the first frequency depends on a capacitance of the buffer capacitor.

9. A circuit for a lamp, comprising:

a first sub-circuit for connecting to mains voltage of a predetermined frequency for rectifying the mains voltage and forming a rectified mains voltage having a first frequency;

a second sub-circuit connected to the first sub-circuit for providing an alternating current required for the lamp, the alternating current having a second frequency; and a control circuit which is connected to the first sub-circuit and the second sub-circuit and which controls the second frequency of the alternating current subject to the first frequency, the control circuit controlling a first transistor having a first terminal and a second transistor having a second terminal, the first transistor and the second transistor being connected together at a common terminal;

a first buffer capacitor connected between the lamp and the first terminal; and a second buffer capacitor connected between the lamp and the second terminal;

wherein the control circuit controls a phase of the alternating current provided by the second sub-circuit such that this is the same as a phase of the first frequency, and wherein a peak-to-peak value of a voltage signal of the rectified mains voltage having the first frequency depends on a combined capacitance of the first buffer capacitor and the second buffer capacitor.

10. A method for operating a lamp, comprising the acts of:

forming a rectified mains voltage by rectifying a supplied mains voltage having a first frequency and bringing a voltage level of the mains voltage to a desired voltage level;

generating from the rectified mains voltage a voltage signal having a second frequency;

generating an alternating current having a third frequency to operate the lamp by controlling a first transistor having a first terminal and a second transistor having a second terminal, the first transistor and the second transistor being connected together at a common terminal;

wherein the third frequency of the alternating current is synchronized with the second frequency;

providing a first buffer capacitor between the lamp and the first terminal; and providing a second buffer capacitor connected between the lamp and the second terminal;

wherein a peak-to-peak value of a voltage signal of the rectified mains voltage having the first frequency depends on a combined capacitance of the first buffer capacitor and the second buffer capacitor.

11. A method for operating a lamp, comprising the acts of:

forming a rectified mains voltage by rectifying a supplied mains voltage and bringing a voltage level of the mains voltage to a desired voltage level;

generating from the rectified mains voltage a signal having a first frequency; and generating an alternating current having a second frequency by controlling a first transistor having a first terminal and a second transistor having a second terminal, the first transistor and the second transistor being connected together at a common terminal;

wherein the second frequency of the alternating current is controlled subject to the first frequency, and wherein a phase of the alternating current is equal to a phase of the signal;

providing a first buffer capacitor between the lamp and the first terminal; and providing a second buffer capacitor connected between the lamp and the second terminal;

wherein a peak-to-peak value of a voltage signal of the rectified mains voltage having the first frequency depends on a combined capacitance of the first buffer capacitor and the second buffer capacitor.

* * * * *